Patented July 9, 1935

2,007,170

UNITED STATES PATENT OFFICE 2,007,170

OXIDE ELECTRODE FOR ALKALINE ACCUMULATORS

Johann Bacsa, Pressbaum, Austria, assignor of one-fifth to Alfred Oberle, Washington, D. C., and one-fifth to Stephan Mittler, Vienna, Austria No Drawing. Application December 1, 1930, Serial No. 499,404. In Austria December 17, 1925

4 Claims. (Cl. 136—28)

This application is a continuation in part of my application Serial No. 219,372 filed September 7, 1927, and relates to new and useful methods of producing positive and negative electrodes for storage batteries and assembling the same in an alkaline electrolyte to form alkaline accumulators of particularly light weight and high resistance against mechanical and electrical wear and tear.

It is already known to prepare positive nickel oxide electrodes by anodic oxidation of nickel electrodes in weak alkaline liquor, whereby a layer of nickel hydroxide is formed which does not well adhere to the nickel surface and loosens easily therefrom thus causing loss of nickel since the nickel hydroxide is formed out of the nickel of the electrode itself. Attempts have been made to overcome this difficulty by utilizing wrappings or gelatinous electrolytes when preparing the electrodes.

The object of this invention is to produce electrodes consisting of the metals of the nickel group (iron, cobalt, nickel) and cadmium, the active layer of which adheres firmly on the surface of the electrodes being in molecular combination therewith. Such electrodes are of high resistance against blows and vibrations as well as against exhaustion of capacity and short-circuits.

Of the metals of the nickel group positive electrodes are produced of nickel or cobalt or iron plated with nickel or cobalt by the process indicated hereinafter. Such nickel or cobalt oxide surface electrodes may be used in combination with electrolytes and negative electrodes of any known kind. They may, however, be used with greater advantage in combination with negative electrodes and electrolytes made according to this invention as indicated hereinafter. From pure iron, electrodes may be formed in the same way as from nickel or cobalt and may be used as negative electrodes in alkaline liquor in combination with nickel or cobalt oxide electrodes made according to this invention or with positive electrodes of any known kind.

Of the metals of the zinc group both cadmium plated zinc and pure cadmium are adapted for the production of negative electrodes according to this invention as indicated hereinafter. Such electrodes may be used with especial advantage as negative electrodes in combination with positive electrodes of cobalt or nickel oxide according to this invention as indicated hereinafter.

The process of manufacturing electrodes according to this invention differs from the known processes in that instead of preparing the active mass out of the metal of the electrode, this active mass is electrolytically deposited on the electrode which serves merely as a mass carrier and therefore may consist of extraordinarily thin sheet metal or wire fabric, and that the nickel-ions are deposited on the previously oxidized surface of this carrier by a cathodic treatment in salt solution whereby the deposited nickel-ions are oxidized to nickel-oxide by means of the excess of oxygen in the prepared superoxide layer of the carrier surface, whereby the superoxide layer itself is reduced to a lower oxide. By using an external source of electricity, it is self evident that the process is under control, which is not the case when one has to depend entirely on the current set up in the lixivium. By cathodically treating an electrode not pre-oxidized in a neutral or somewhat sour salt solution a metallic coating of pure metal is deposited thereon as well-known in the galvanic art. This is therefore to be used as the first step in producing positive nickel or cobalt oxide surface electrodes on an iron carrier or in producing negative cadmium surface electrodes on a zinc carrier which of course is cheaper than a carrier of nickel or cobalt, or cadmium, respectively. When producing electrodes the active mass of which consists of the same metal (or oxide thereof) as the carrier, this step may be dispensed with but may, however, be employed with good advantage, since the metal galvanically deposited on the electrode surface is much purer than the ordinary commercial sheet metal or wire.

The second step, which is common to the treatment of all electrodes according to this invention, is anodic oxidation in strong alkaline solution. Thereby the surface of the electrodes, is transformed into an oxide not soluble in alkaline solution.

The third step, which is also common to all electrodes, is cathodic reduction which with electrodes of nickel, cobalt or iron surface takes place in a neutral or somewhat sour salt solution of the same metal as the surface of the electrodes consists of. Thereby nickel, cobalt or iron ions respectively, are deposited on the electrode and enter into chemical combination with part of the oxygen of the superoxide layer reducing the same to lower oxide and being at the same time oxidized itself to lower oxide, thus increasing the thickness of the well adherent porous layer of oxide at the surface of the electrode. When the total surplus of oxygen contained in the superoxyde is consumed metallic nickel, cobalt or iron, respectively, would be deposited which is not desirable; therefore the cathodic reduction must be finished when this point has been reached which is indicated by vanishing of the back E. M. F. With electrodes of cadmium surface this step of reduction takes place in alkaline solution whereby the oxide is simply reduced to metallic cadmium of porous structure.

In the production of electrodes the surface of which consists of nickel, cobalt or iron, merely the second and third step are to be repeated; by the anodic oxidation in alkaline solution a storage of oxygen is accumulated in the form of superoxide which by cathodic reduction in the neutral or somewhat sour salt serves to bind the new deposit molecularly in the form of the lower oxide which is of a desirable porous character and adheres well to the electrode. Since the carrier is not dissolved during the entire process it may consist of extraordinarily thin sheet metal or wire fabric and the ratio of weight between the active metal oxide mass and the carrier is several times better than that of any known electrodes.

With electrodes of cadmium surface the first step (cathodic deposition of metallic cadmium) must be interposed before repeating the two other steps since by the cathodic reduction in alkaline solution to oxide is merely reduced to metallic cadmium and no increase of thickness is obtained which therefore must be effected by ordinary electrolytic deposition. The cycle of formation therefore consists of the first, second and third step with cadmium surface electrodes.

Referring now to the products of the processes described above, the following combinations of electrodes and electrolytes may be used in accumulators according to this invention:

1. A nickel or cobalt superoxide surface electrode made as described hereabove as positive electrode together with any known negative electrode in any known alkaline electrolyte.

2. A ferrous oxide or cadmium surface electrode made as described hereabove as negative electrode together with any known positive electrode in any known alkaline electrolyte.

The preferred form is:

3. A nickel or cobalt superoxide surface electrode as positive electrode and a ferrous oxide or cadmium surface electrode as negative electrode in any known electrolyte, both the positive and negative electrodes being produced as described hereabove.

When discharging an accumulator according to this invention, the oxygen goes from the positive electrode to the negative electrode and the capacity of the cell is exhausted when the entire superoxide of the positive electrodes is reduced to the lower oxide, whilst the negative electrodes are oxidized. Thus the discharging and recharging of such accumulators consists merely in a change of oxygen between the electrodes, which when discharging goes from the positive electrode to the negative and when recharging goes back. This is somewhat similar to ordinary lead accumulators. As the electromotive force is due only to the oxygen the voltage of such cells amounts only to 1.3 volt which, however, is no drawback since their capacity per foil weight is so high, that the weight per watt hour is much lower than that of any known storage battery cell.

The anodic oxidation takes place at an electric potential of at least 1.7 to 2 volts in an alkaline solution, the strength of which may vary, but 18% to 20% caustic soda solution is preferred.

The cathodic reduction must take place under the conditions of temperature, current density and concentration as known from the galvanic art for the production of so-called "soft" nickel plating. For this purpose the voltage must be at least 0.3 to 0.8 volts higher than the voltage of decomposition of the salt solution used. The latter must not be alkaline in any case nor should it be too acid but should be neutral or only somewhat acid; a red Congo-paper should not yet become blue. A good circulation of the solution must be provided for. 300 grams of nickel sulphate or chloride per litre of water is the preferred strength of solution for cathodic reduction of the nickel electrodes.

All the electrodes according to the above described invention are of extraordinary resistance both against mechanical and electrical wear and tear; the electrodes may be bent or hammered, entirely electrically exhausted even by short-circuits or left in an exhausted state for an unlimited time without becoming spoiled or the active mass becoming loose.

Solutions of sodium or potassium hydroxide, preferably in concentrations amounting to from 18% to 20% are generally used for the anodic oxidation. Such solutions are well known in the manufacture of storage batteries, such as the alkaline accumulators. It is solutions of this character which constitute the lixivium, forming the electrode of the finished accumulator.

I claim:

1. An electrode for alkaline accumulators, said electrode including a metallic sheet of a metal of the nickel group carrying a metal oxide of the same metal in molecular combination therewith.

2. An electrode for alkaline accumulators, said electrode including a sheet of nickel carrying nickel oxide in molecular combination therewith.

3. An alkaline accumulator comprising an alkaline electrolyte, an electrode including a metallic sheet of a metal of the nickel group carrying a metal oxide of the same metal in molecular combination therewith, and a negative electrode.

4. An alkaline accumulator comprising an alkaline electrolyte, an electrode including a metallic sheet of a metal of the nickel group carrying a metal oxide of the same metal in molecular combination therewith, and a negative cadmium electrode.

JOHANN BACSA.